Dec. 14, 1965  L. STADLIN  3,223,964

ULTRASONIC MATERIAL MEASURING AND CONTROL SYSTEM

Filed June 27, 1962  2 Sheets-Sheet 1

INVENTOR
Louis Stadlin

BY Moore, Hall & Pollock
ATTORNEYS

Dec. 14, 1965    L. STADLIN    3,223,964
ULTRASONIC MATERIAL MEASURING AND CONTROL SYSTEM
Filed June 27, 1962    2 Sheets-Sheet 2

INVENTOR
Louis Stadlin

BY *Moon, Hall & Pollock*

ATTORNEYS 3,223,964
ULTRASONIC MATERIAL MEASURING AND
CONTROL SYSTEM
Louis Stadlin, 3827 Kecoughtan Road, Hampton, Va.
Filed June 27, 1962, Ser. No. 205,707
12 Claims. (Cl. 340—1)

The present invention concerns the measurement by ultrasonic means of ore, cement, grain, coal, liquid and similar material capable of being stored in bins, hoppers, vats or similar storage facility.

It is an object of the invention to provide a control system by which the height of ore or other material in a bin is measured and an indication is given at a remote point whether the height of material is too low, normal or too high, and if dangerously high the delivery of material to the bin is automatically discontinued.

It is an object of the invention to provide an alarm system for indicating by suitable signal when the amount of material being stored or deposited in a bin is too low or too high.

It is an object of the invention to mount an ultrasonic transducer in the air above a pile of material being deposited and to measure the height of the pile from instant to instant by means of ultrasonic pulses generated by a transmitter and directed at the material thru the transducer, the echos being reflected from the top surface of the pile of material and detected by the transducer which converts the sound energy to electrical energy, the receiver amplifies the echo signal and applies it to means for measuring the pile and automatically providing telemetric indication, warning signals, or permanent records of material quantity, warnings and action taken such as starting and stopping material delivery.

It is an object of the invention to provide a process for measuring material height in a bin by ultrasonic means, using air as the medium for transmitting ultrasonic pulses to the pile surface and the echoes reflected therefrom.

It is an object of the invention to provide a platten which functions as a pick off and cooperates with the pen structure stylus or equivalent output of an ultrasonic echo sounder constructed to operate successively in air.

It is an object of the invention to provide automatic measurement-control means for piles of materials with step-by-step measurement and step-by-step control of the amount of material in the bin, hopper, vat or the like.

It is an object of the invention to provide automatic measurement-control means for a plurality of piles of material with step-by-step measurement and control in which a plurality of material delivery means are controlled in relation to each other.

It is an object of the invention to determine the level of ore, sand, gravel, cement, grain or liquid in a storage or loading bin, hopper, or other large container or a plurality of such containers, to give telemetric indication of the level and automatically to take whatever action with regard thereto as may be required for maintaining said level or levels within desired limits for operational or safety purposes.

It is an object of the invention to provide an ultrasonic teleindicator-control system having a recorder platten of insulating material and a plurality of event bars embedded therein and connected to an indicator-actuator circuit in which the echo signal can be impressed on one bar at a time having position on the time scale related to a particular material height for remote indication and automatic control of the operation.

Reference is made to the drawings in which the several figures are presented as illustrative of one of the many forms the invention may take and are not to be construed as limiting.

Figure 1:
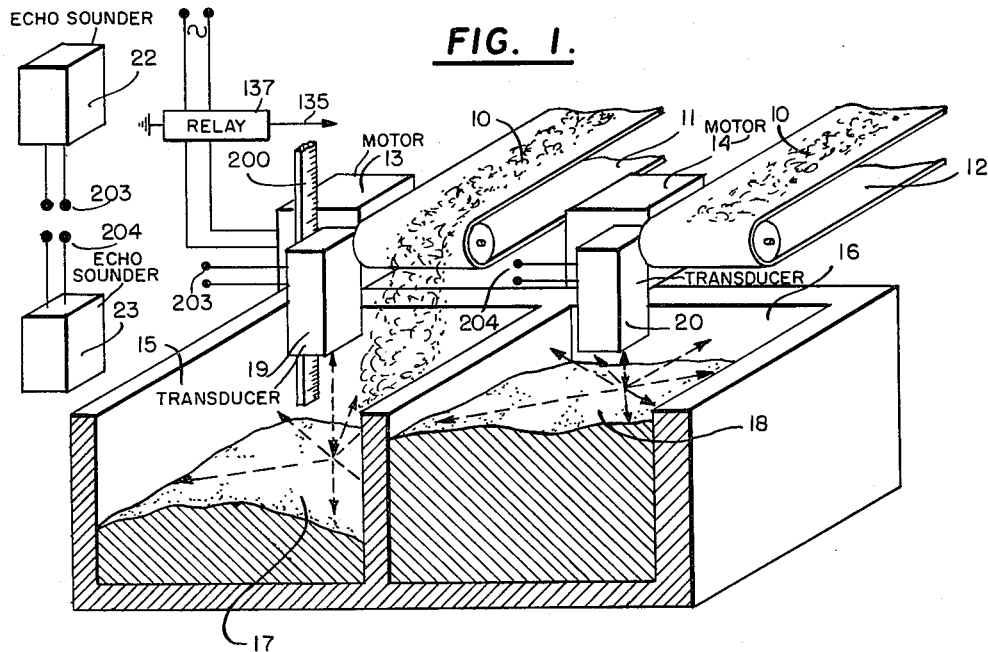
FIGURE 1 is a three-dimensional diagram showing one form of system, incorporating the invention as installed in an ore unloading facility.

Material 10, such as ore or the like, is transported from a ship's hold or other source by conveyer belts 11 and 12 driven by electric motors 13 and 14. Material 10 is deposited by the belts 11 and 12 in suitable bins 15 and 16 in which it forms a pile such as 17 and 18. The amount of material 10 in a given pile 17 is measured by an ultrasonic transducer 19 mounted adjacent the end of conveyer 11 on the same support that mounts motor 13. The bins 15 and 16 are much larger than would appear from their relative size in FIGURE 1 and the material 10 in pile 17 tends to build up under the end of conveyer 11 and ultrasonic transducer 19. The angle of repose of the material 10 is such that the mound directly under the transducer 19 is sufficiently flattened that a satisfactory representative measurement can be made. Pile 18 is measured by transducer 20, only the transducer is mounted above the hoppers. The rest of the equipment is mounted in the control room. Echo sounders 22 and 23 each may comprise an ultrasonic recording echo sounder of the type MS 28 or MS 29 as marketed by Kelvin & Hughes America Corporation of Annapolis, Maryland, modified to incorporate the present invention. They are preferably located in a suitable control room removed from bins 15 and 16.

An ultrasonic pulse is directed toward the pile 17 by transducer 19. A small amount of echo energy 21 reflected by the surface of pile 17 is received by transducer 19, transformed into electrical energy and amplified. The time of travel of the pulse to the surface of the pile 17 and its return to transducer 19 is measured and utilized as a measure of the height of the top surface of the pile 17. As the speed of sound in air at sea level is about 1088 ft./sec. and the total lengths of paths of the signal and its echo may vary from about nine feet to eighty or a hundred feet, the ultrasonic pulse plus echo transit time may vary from about 8 milli-seconds to about a tenth of a second.

The echo sounder 22 is provided with a dry recorder which utilizes a metal platten traversed by a stylus or metal point on which is impressed the amplified echo signal. If the initial movement of the stylus from a datum position is synchronized with the emission of an ultrasonic pulse from transducer 19 toward pile 17, the displacement of the stylus from datum at the time the amplified echo signal appears on the stylus is an indication of the distance between transducer 19 and the top of pile 17 and therefore of the height of the pile 17 or of its depth, where the distance from transducer 19 to the bottom bin 17 may be taken as a constant, as in FIGURE 1.

Where a permanent record is desired a voltage sensitive paper may be moved at a constant speed between the solid metal grounded platten and the needle and will show a permanent trace during those periods when an amplified echo signal is applied to the pen.

Figure 2:
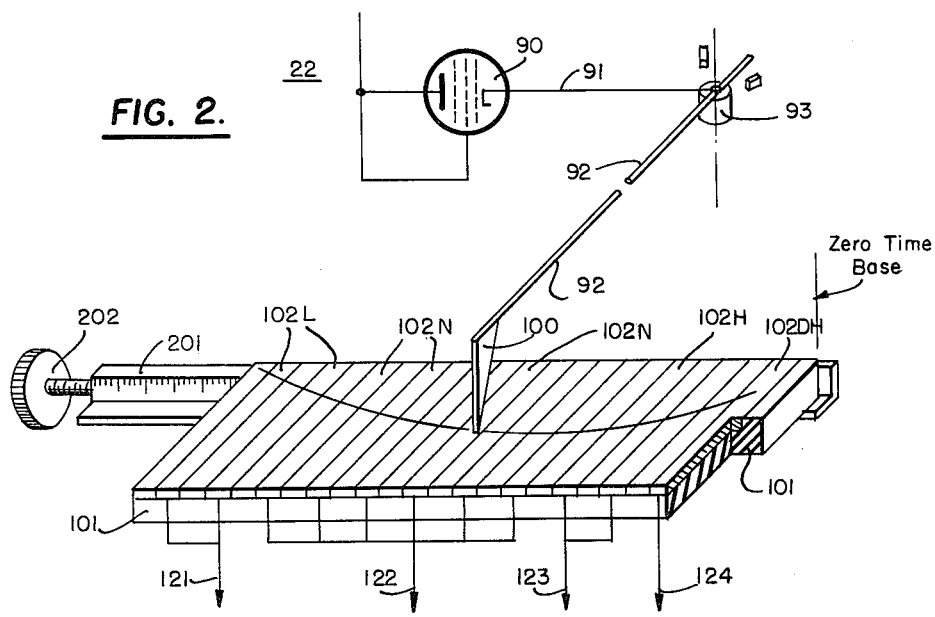
FIGURE 2 is a fragmentary cabinet projection of one form of new type of platten control assembly according to the invention.
Figure 3:
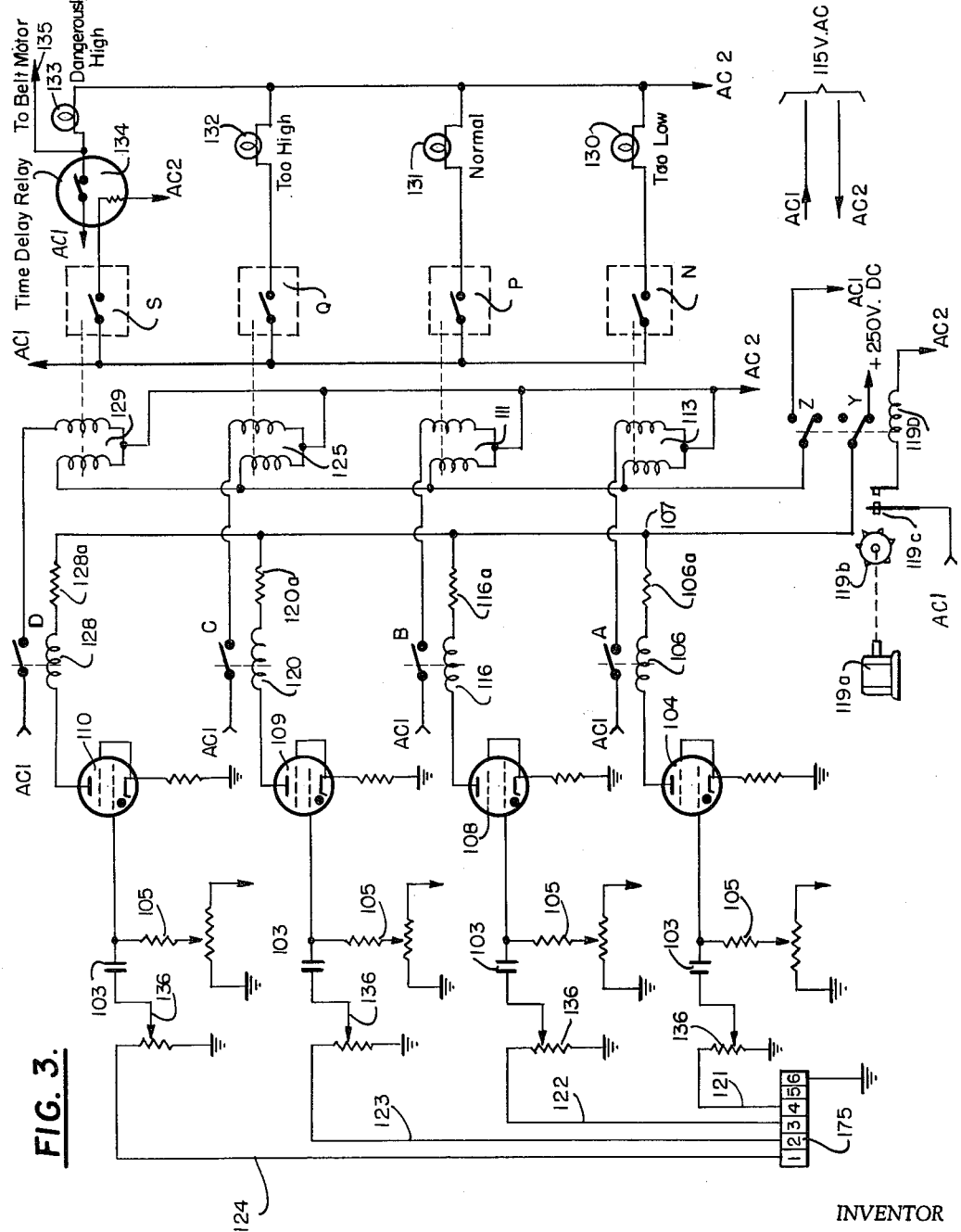
FIGURE 3 is a schematic circuit diagram of an indicator activating unit comprising a sub-combination of the invention.

As shown in FIGURE 2, the final stage of the receiver of echo sounder 22 comprises an output pentode 90 or transistor equivalent connected by a wire 91 to stylus 92, mounted for rotation at bearing 93, so as to cause stylus 100 to sweep across improved platten 101 which is made of insulating material according to the invention instead of solid metal and is provided with a number of transverse metal contact bars 102. The stylus 100 makes contact with the insulated metal bars 102 and applies the amplified echo signal output of pentode 90 thereto. The stylus 100 of the recording read-out of echo sounder 22 starts from zero time base on platten 101, comprising a body of insulating material such as Bakelite in which are embedded as many as a dozen metal contact bars 102 transversely disposed in parallel relation. There should be a contact bar for every separate measurement of material 10 desired, but it is preferred to have a larger number for increased flexibility. Extra bars 102 may be connected together in parallel and can be shifted as circumstances and bin capacity may require.

Bars 102 are selected as representative of different conditions of ore depth which are desired to be indicated or to actuate equipment. Bar 102L represents an ore depth which is too low and may be coupled with the bar 102 next below it to the left as shown in FIGURE 2, so that they both operate in parallel. Bar 102N may be selected from among several as representing the normal level of ore in pile 17 and as this level may cover a large part of the detection range of the system, six bars 102, including bar 102N are shown connected together in a group. Contact by stylus 100 with any one of the group of six, provides an indication of normal level.

Bar 102H indicates a high level of ore in the bin. Bar 102DH indicates a dangerously high level of ore and is connected both to give a signal indicative of the condition and to stop additional delivery of the ore to the particular bin as long as the dangerously high level exists. This signal would automatically cut off the ore feed by stopping belt 11 until enough ore 10 has been used from the bin 15 to cause the ore level to return to normal as indicated by a voltage signal on the group of bars connected with bar 102N. This signal may be used to operate a relay 137 and start motor 13. In this application of the equipment the ore 10 is removed from bin 15 through a weighing station below the bottom of the bin 15 and deposited in a railroad hopper car.

The detected echo signal determined by the ore level is supplied to moving stylus 100 from the cathode of the output tube 90 or equivalent transistor connection of the echo sounder 22, as it traverses the platten 101 and is transferred to the one or more bars 102 with which it is in contact, during the period an echo signal is applied to stylus 100.

Bar 102L is connected by a suitable Jones plug 175 through wire 121 to potentiometer 136, and through it to ground. The center arm of potentiometer 136 is connected through condenser 103 to the control grid of thyratron 104 which is biased negatively by potentiometer 105. The plate of thyratron 104 is connected to plus 250 volts D.C. through the coil of plate relay 106, resistor 106A, junction 107, and normally closed contacts Y of relay 119. In a similar manner bar 102N is connected by wire 122 to thyratron 108, bar 102H by wire 123 to thyratron 109, bar 102DH by wire 124 to thyratron 110.

When a signal of sufficient amplitude is impressed on bar 102L it is conveyed by wire 121 to the grid of thyratron 104. The signal overcomes the bias on thyratron 104 and it fires, energizing relay 106, closing contact A of the relay. This action energizes the latching coil of relay 113 and closes contact N. The closing of contact N energizes a light 130 to indicate that the level of ore pile 17 is too low in the bin 15. In a similar manner when the ore pile 17 reaches a normal level in the bin 15 the same sequence of events will take place but using bar 102N, wire 122, thyratron 108, relays 116, contacts B, relay 111, and contact P to energize signal light 131. In a similar manner when the ore pile 17 reaches a level that is too high the same sequence of events will take place but using bar 102H, wire 123, thyratron 109, relay 120, contacts C, relay 125, and contact Q, to light signal light 132, indicating too high a level of ore pile 17 in the bin 15. Finally, when the ore pile 17 reaches a dangerously high level the same sequence of events will take place, but using bar 102DH, wire 124, thyratron 110, relay 128, contacts D, relay 129 and contact S to energize signal light 133.

To prevent all the indicator lights from staying on once they are lit the following resetting action takes place. One r.p.m. motor 119A rotates six point cam 119B, closing contact 119C. This action energizes relay 119D which opens contact Y and disconnects 250 volts D.C. from thyratrons 104, 108, 109 and 110. Also contact Z closes energizing the unlatching coils of relays 113, 111, 125, and 129. This resetting sequence takes place once every 10 seconds and requires a fraction of a second. In the dangerously high position a time delay relay 134 is inserted in the circuit. Contact S closes the circuit to the heater of time delay relay 134. After 15 seconds the contact in time delay relay 134 closes, energizing the signal light 133 and actuating an external circuit 135 to stop the conveyer belt 11 from delivering ore 10 to the bin 15. This time delay relay 134 is used to prevent the conveyer belt 11 from being stopped by a random pulse on bar 102DH. In order to stop the conveyer belt 11 it would require a continuous signal on bar 102DH for at least 15 seconds and this could only be caused by the ore level having risen to the dangerously high level.

For some applications, particularly those in which liquid levels are to be measured it is desirable to mount the transducers 19 and 20 on suitable calibrated guideways 200 which may be as long as fifty or more feet. A transducer may thereby be quickly moved up or down to a desired height for effective operation and locked in place by a set screw, clamp or the like. The invention lends itself to reasonably accurate measurements.

Where finer adjustment is desired for more exact indication or operation of auxiliaries at a definite height of liquid, the platten 101 may be movably mounted in calibrated guideways 201 (only one of which is shown in FIGURE 2) and moved in small increments by thumb wheel 202 which operates a suitable worm drive to move platten 101 by quite small amounts. In this manner any given installation can be adjusted in micrometer fashion to energize selected relays connected to any of the bars 102 to perform any desired related function required to facilitate the operation of the installation in a partial or fully automatic manner.

Transducers 19 and 20 are connected by circuits 203 and 204 respectively, to the echo sounders 22 and 23 located at a suitable place usually remote from bins 15 and 16. In this manner a larger number of systems can be supervised by a single individual. Where a plurality of transducers 19, 20, etc. are to function to determine liquid level in a plurality of similar liquid storage tanks provided with valved supply, outlet and interconnecting pipes, the activation of the signal 133 can be used to open one or all of the interconnecting conduit valves by a connection such as 135. A signal on wire 135 would then operate a relay 137 to actuate a servo to shut off the valve in the supply line of the particular tank in which the liquid level is being sensed.

All such valves would be provided with servo-motors which would be constructed to return them to their initial condition when both warning signals 132 and 133 are de-energized and normal conditions are indicated at 131. A normal signal at 131 may be utilized to initiate the return action of the servo-motors by the operation of a relay or other control in their respective circuits.

The time required for the sound pulse to leave the transducer 19, refiect off the ore pile 17 and return to the transducer 19 is constant for any given distance between the ore pile 17 and the transducer 19. As the ore pile 17 becomes higher in the bin 15 the time required for the sound pulse to leave the transducer 19 and the echo to return becomes less. Conversely as the ore pile 17 becomes lower in the bin 15 the time required for the sound pulse to leave the transducer 19 and the echo to return becomes greater. Stylus arm 92 is driven by a motor about pivot 93 at a constant rate of speed. As the stylus passes zero time a contact is closed which sends out the sound pulse from the transducer. As the sound pulse is travelling towards the ore pile 17 and returning as an echo to the transducer 19 the stylus 100 is moving across the platten 101. Because of the constant rate of speed of both the sound pulse and the stylus the pulse length can be so chosen that the returned echo will only be impressed across one metal bar 102 for any given height of the ore pile 17 in the ore bin 15.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. An ultrasonic material measuring and control system comprising transducer means, means mounting said transducer means in a suitable position for measuring the effective height of a quantity of material, echo sounder means connected to said transducer means having signal output means providing output signals corresponding to echoes received by said transducer means, signal discriminating means connected to said signal output means for selecting output signals representing different quantities of material being measured, relay means connected to said discriminating means for operation in response to selected output signals and material delivery means controlled by said relay means.

2. The combination set forth in claim 1, including a material delivery control circuit connected to said material delivery means and to said relay means, and delay means in said delivery control circuit.

3. The combination set forth in claim 1, including material quantity indicating means connected to said relay means, and resetting means for resetting said indicating means.

4. The combination set forth in claim 3, wherein said resetting means comprises cyclically operative means for resetting said indicating means at regular intervals to clear said indicating means for the indication of new signals.

5. The combination set forth in claim 1, wherein said discriminating means comprises a block of insulating material having a plurality of circuit elements mounted thereon and connected to said relay means for selective operation thereof, and material quantity indicating means connected to said discriminating means for selective operation to indicate different quantities of material to be measured in response to different signals from different ones of said circuit elements comprising said discriminating means.

6. The combination set forth in claim 5, wherein said block comprises a body member having said circuit elements mounted thereon in spaced relation, said signal output means having contact means for contacting said circuit elements one at a time in a timed sequence related to said output signals.

7. The combination set forth in claim 6, including means mounting said body member for movement relative to said contact means, and scale adjustment means for moving said body member by small increments with respect to said contact means.

8. The combination set forth in claim 1, including means mounting said transducer means for movement to and from said material being measured, and scale means associated with said means mounting said transducer for movement to provide a measured adjustment of the said transducer means with respect to said material.

9. Apparatus for measuring and controlling the size of the quantity of material in a container comprising means projecting pulsed ultrasonic energy through air from a position above a mass of material toward said mass of material, means receiving echoes of said pulses of energy, means measuring the elapsed time of transit of said pulses, means discriminating among selected values of a plurality of different elapsed times of transit of said pulses to determine whether the quantity of material being measured exceeds a desired quantity, means indicating said condition of excess when it exists, and means controlling any addition of said material to said quantity in response to said discriminating determination of said discriminating means.

10. The combination set forth in claim 9 in which said means controlling any addition of said material to said quantity includes means controlling the movement of a conveyer belt conveying additional material to a pile of said material being measured.

11. The combination set forth in claim 10, including means delaying the action of said controlling means in response to an indication of said condition of excess for a limited time to assure that an excess condition does in fact exist thereby to eliminate random indications of said excess condition.

12. The combination set forth in claim 11, including means adjusting the distance to be measured by the pulsed ultrasonic energy to fall within a selected pair of approximate maximum and minimum values.

References Cited by the Examiner

UNITED STATES PATENTS

| | | | |
|---|---|---|---|
| 2,118,518 | 5/1938 | Neumann | 340—3 |
| 2,584,128 | 2/1952 | Hildyard | 331—65 |
| 2,660,054 | 11/1953 | Pringle | 73—67.7 |
| 2,742,639 | 4/1956 | Moore et al. | 343—13 |
| 2,943,296 | 6/1960 | Fryklund | 340—1 |
| 3,077,107 | 6/1963 | Henry | 340—1 X |

CHESTER L. JUSTUS, *Primary Examiner.*